United States Patent
Brown et al.

(10) Patent No.: US 9,864,513 B2
(45) Date of Patent: Jan. 9, 2018

(54) RENDERING A VIRTUAL INPUT DEVICE UPON DETECTION OF A FINGER MOVEMENT ACROSS A TOUCH-SENSITIVE DISPLAY

(75) Inventors: Craig T. Brown, Cypress, TX (US); Paul J. Doczy, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1253 days.

(21) Appl. No.: 12/344,425

(22) Filed: Dec. 26, 2008

(65) Prior Publication Data

US 2010/0164959 A1    Jul. 1, 2010

(51) Int. Cl.
*G06T 13/00* (2011.01)
*G06F 3/0488* (2013.01)

(52) U.S. Cl.
CPC ...... *G06F 3/04886* (2013.01); *G06F 3/04883* (2013.01)

(58) Field of Classification Search
USPC .......................................... 345/173
See application file for complete search history.

(56) References Cited

U.S. PATENT DOCUMENTS

| | | | |
|---|---|---|---|
| 6,677,933 B1 | 1/2004 | Yogaratnam | |
| 6,882,337 B2 | 4/2005 | Shetter | |
| 2003/0142081 A1* | 7/2003 | Iizuka et al. | 345/173 |
| 2006/0209040 A1* | 9/2006 | Garside et al. | 345/173 |
| 2006/0238517 A1* | 10/2006 | King et al. | 345/173 |

* cited by examiner

*Primary Examiner* — Kyle Zhai
(74) *Attorney, Agent, or Firm* — Conley Rose

(57) ABSTRACT

A method comprises a processor detecting a person's finger moving across an unrendered portion of a touch-sensitive display. As a result of detecting the finger moving, the method further comprises the processor causing data to be rendered as a virtual keyboard image on the display.

18 Claims, 7 Drawing Sheets

RENDERING A VIRTUAL INPUT DEVICE UPON DETECTION OF A FINGER MOVEMENT ACROSS A TOUCH-SENSITIVE DISPLAY

BACKGROUND

Some computing systems use a touch-sensitive display and do not have a traditional keyboard. Some such computing systems render a virtual keyboard on the display with which the user interacts. A user-friendly technique to display and remove the virtual keyboard is desirable.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
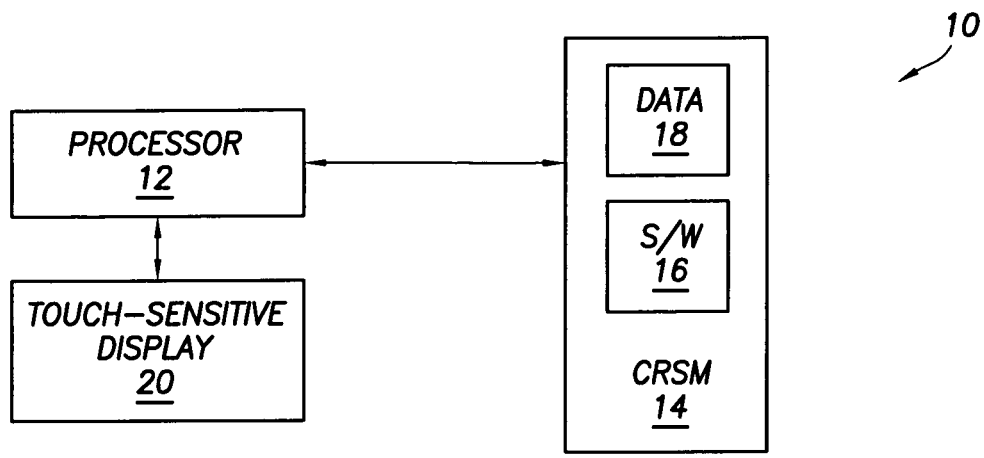
FIG. 1 shows a system in accordance with various embodiments comprising a touch-sensitive display.

FIG. 1 shows a system 10 in accordance with various embodiments. As shown in the illustrative embodiment of FIG. 1, system 10 comprises logic which preferably comprises a processor 12 coupled to a computer-readable storage medium 14. The system 10 also comprises a touch-sensitive display 20. The storage 14 comprises volatile storage (e.g., random access memory), non-volatile storage (e.g., hard disk drive, read only memory, compact disc read only memory, Flash storage, etc.), or combinations thereof. Storage 14 preferably contains software 16 that is executable by processor 12 and, that when executed, causes the processor to perform some or all of the functionality described herein. The storage 14 also contains that data that represents a virtual input device image, such as a keyboard image, when rendered on the display 20.

The touch-sensitive display comprises any suitable type of touch-sensitive display such as a desktop flat panel monitor or a handheld display unit. In some embodiments, the entire system 10 is a hand-held unit, while in other embodiments, system 10 is not hand-held (e.g., a desktop system). In accordance with various embodiments, the system 10 does not have a traditional keyboard, although the system 10 may have a connector to which a keyboard could be connected if desired.

Figure 2:
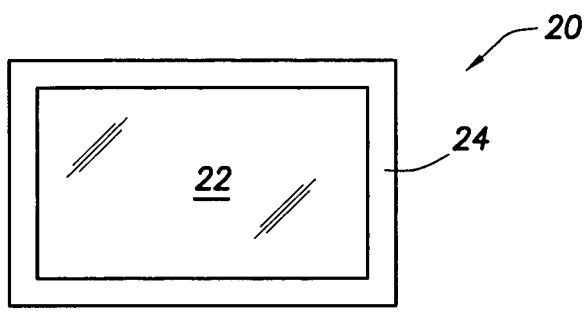
FIG. 2 illustrates renderable and non-renderable portions of the touch-sensitive display in accordance with various embodiments.

FIG. 2 shows the touch-sensitive display 20 comprises a central renderable portion 22 in which data and graphics can be rendered surrounding by an outer portion 24 that is unrenderable. The unrenderable outer portion 24 cannot be, or is not, used to render images of any kind. In some embodiments, the outer portion 24 lies beneath (i.e., is hidden by) a bezel that surrounds the display 20. The bezel may be made from plastic or other suitable material.

In accordance with various embodiments, system 10 enables the user to launch a virtual input device image using a finger gesture across the unrenderable portion of the touch-sensitive display. In the illustrative embodiments shown and described herein, the virtual input device image comprises a virtual keyboard image, but such input device image can comprise other types of input devices such a numeric keypad. The virtual keyboard image (also referred to herein as "virtual keyboard") is rendered on the touch-sensitive display 20 and the user can input alphanumeric characters and activate the functions associated with each of the keys on the virtual keyboard by touching the display at a location commensurate with the images of the keys on the virtual keyboard. For example, touching the image of the letter "A" causes an "A" to be input into the system 10 just as if the "A" button on physical keyboard had been pressed.

Figure 3A:
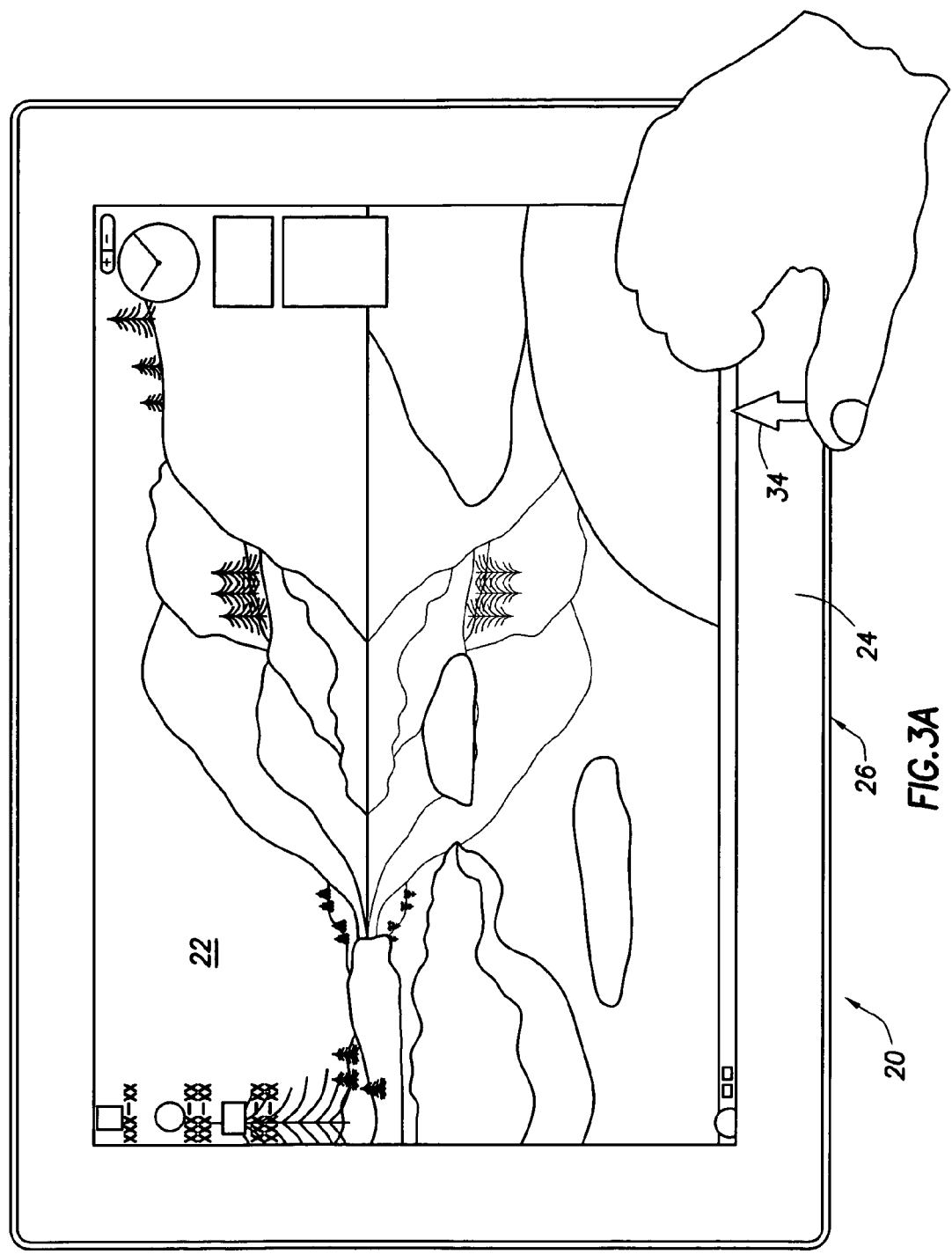
FIGS. 3A-3C illustrate the launching of a virtual input device (e.g., a keyboard) on the display as a result of detecting a finger movement across the unrendered portion of the display in accordance with various embodiments.
Figure 3B:
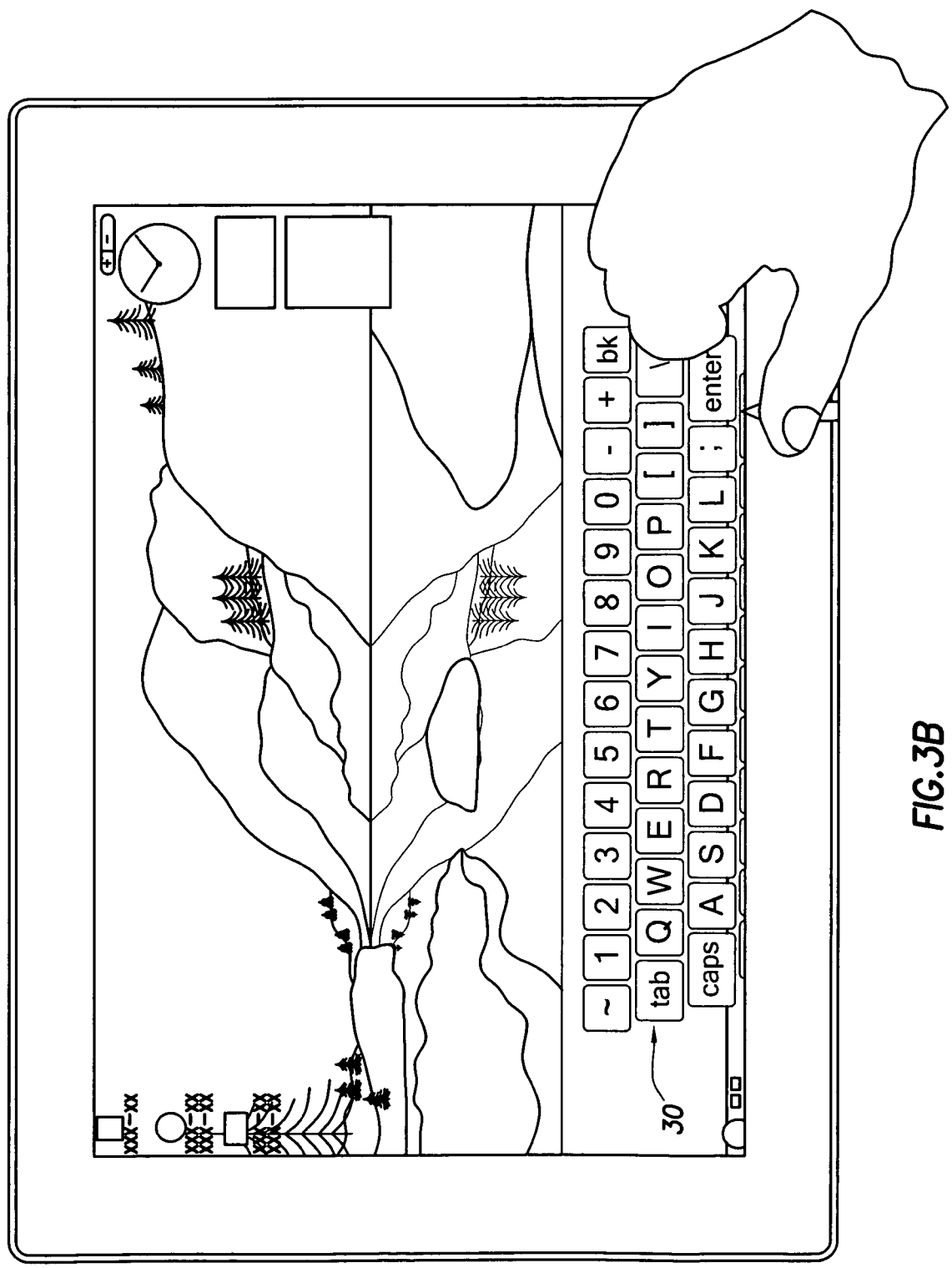
Figure 3C:
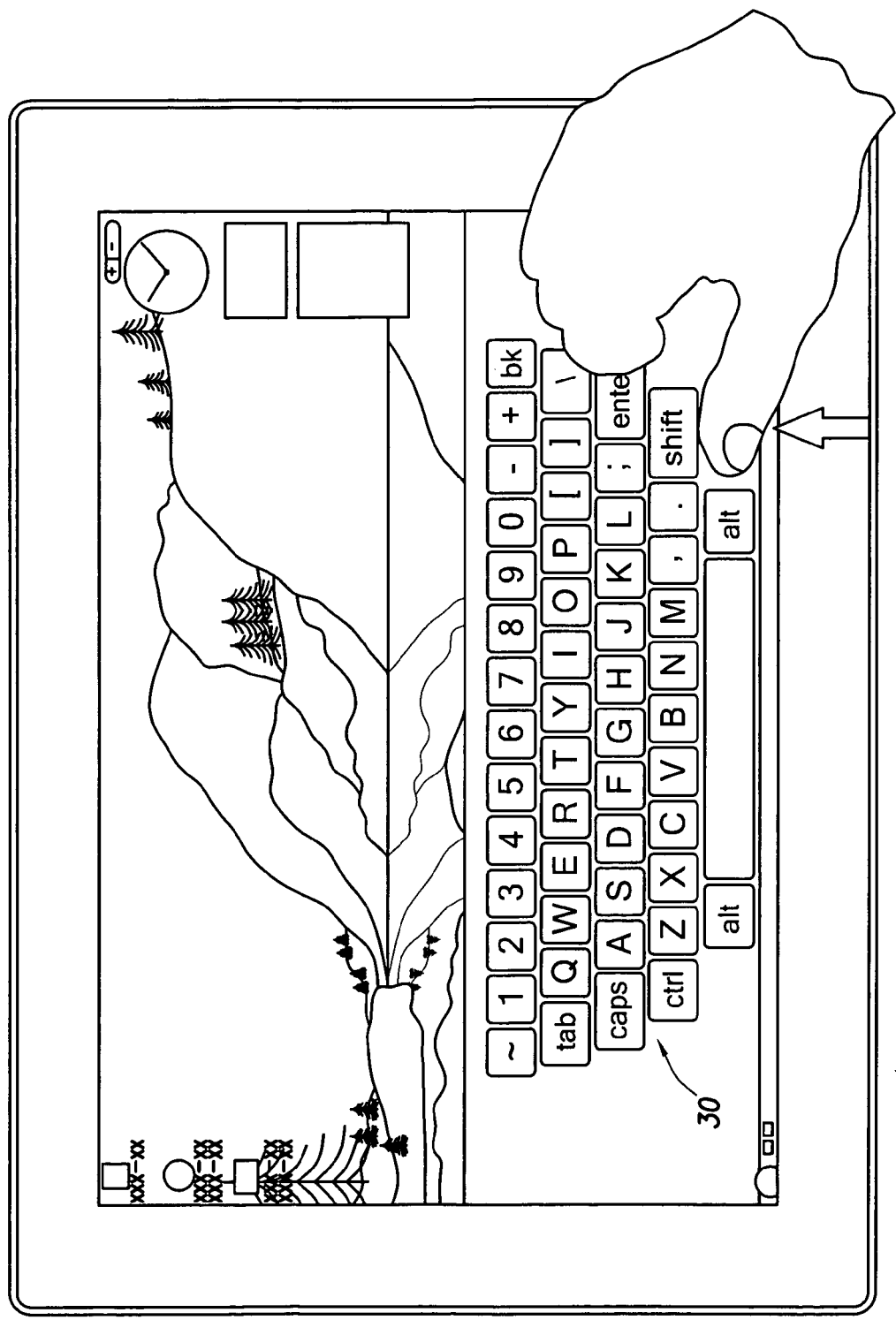

FIGS. 3A-3C illustrate one possible way to launch a virtual display. In the illustrative example of FIGS. 3A-3C, the user moves his finger across an unrendered portion 24 of the touch-sensitive display 20. Specifically, as shown, the user slides his finger from the bottom edge 26 of the display 20 upward in the direction of arrow 34 toward the renderable portion 22 (FIG. 3A). As the user so moves his finger upward, the processor 12 detects that movement, retrieves the data 18 from storage 14, and uses the data 18 to render a virtual keyboard 30 on the display 20. The data 18 is thus transformed by the processor 12 into a virtual keyboard image. In some embodiments, the virtual keyboard 30 is animated and, as such, appears to move (ala video) upward from the unrendered portion 24 entering the rendered portion 22 (FIG. 3B) until the virtual keyboard 30 is fully rendered (FIG. 3C).

Figure 4A:
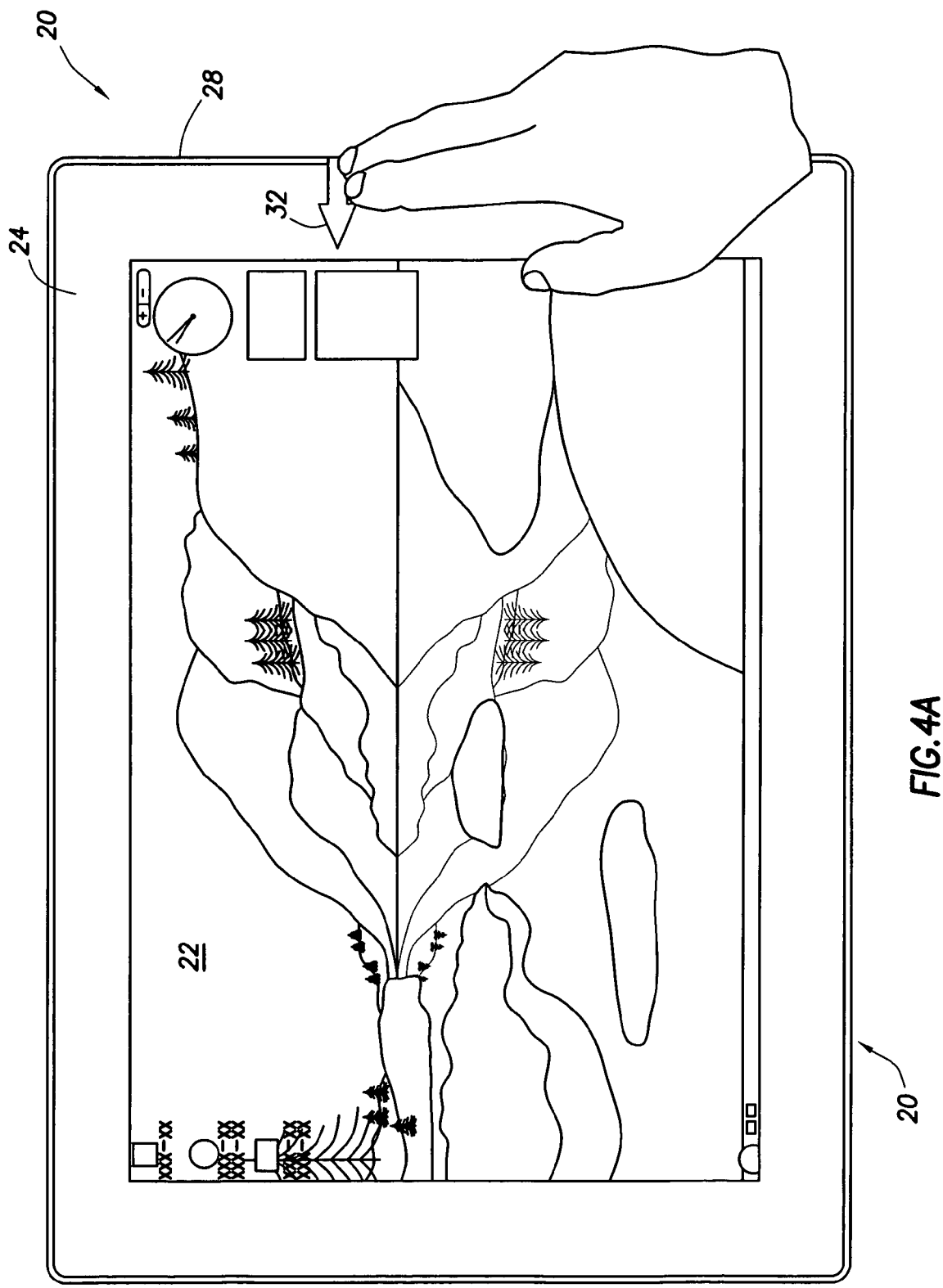
FIGS. 4A-4C illustrate another embodiment of launching a virtual keyboard.
Figure 4B:
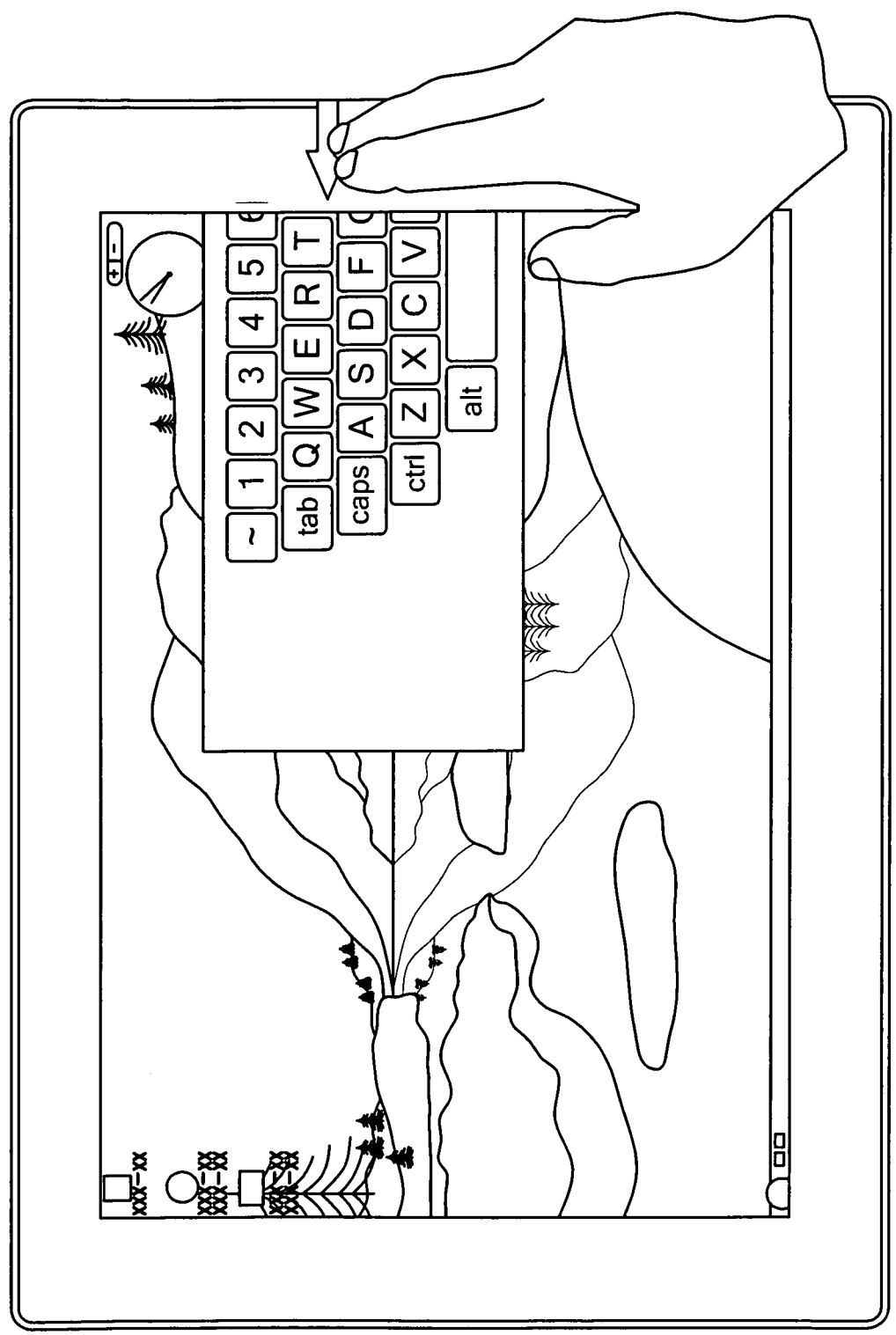
Figure 4C:
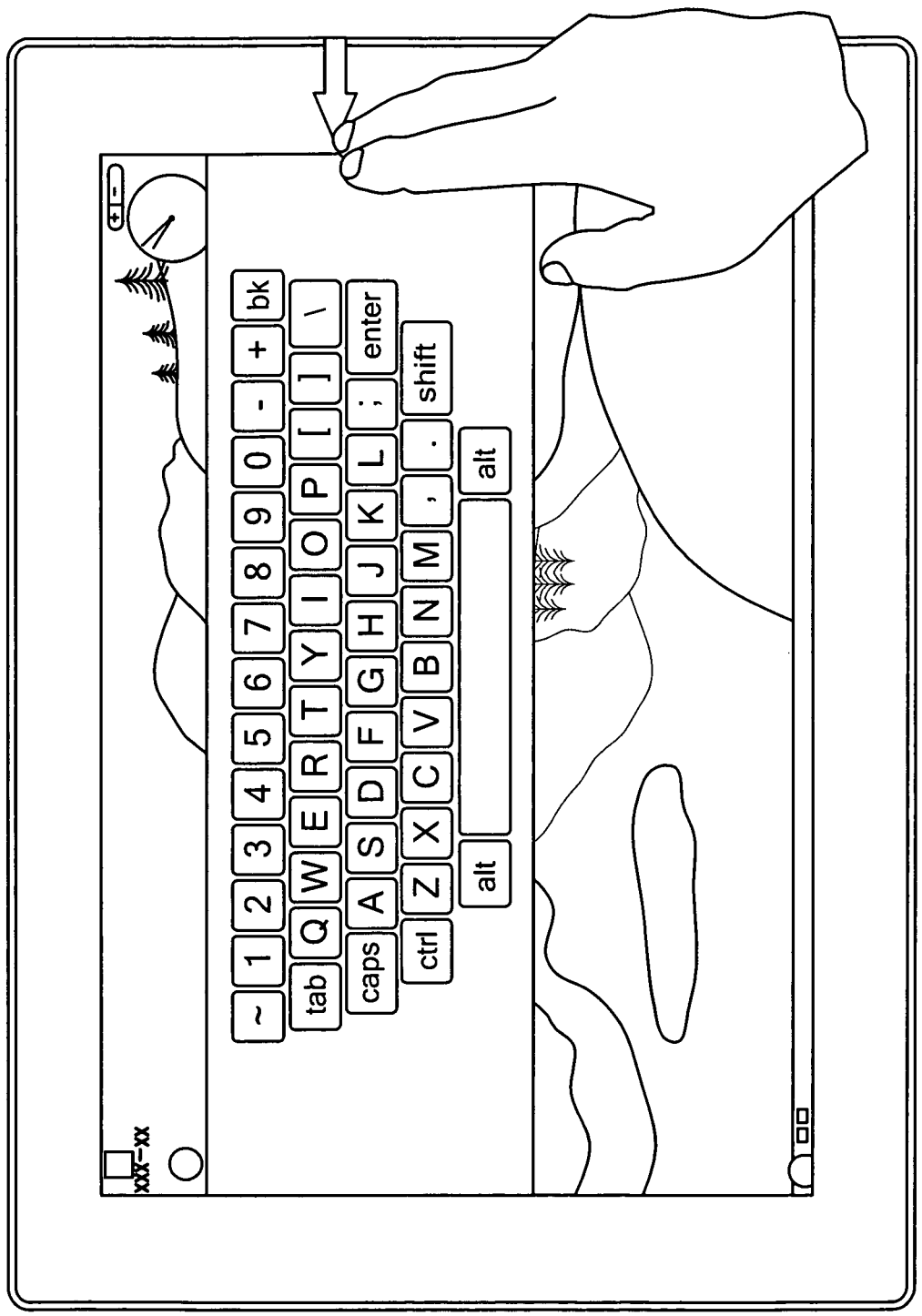

FIGS. 4A-4C represent a similar virtual keyboard launch but from one of the sides 28 of the display 20. The user moves his finger across the unrenderable portion 24 in the direction of arrow 32 toward renderable portion 22 (FIG. 4A). A virtual keyboard 30 begins to enter the renderable portion from the side of the display (FIG. 4B) until it is fully rendered on display 20 (FIG. 4C).

If desired, the virtual keyboard 30 can be removed from the touch-sensitive display 20 (i.e., ceased to be rendered) by the user moving his finger in the opposite direction from the direction used to launch the virtual keyboard in the first place. Thus, for the bottom-up launch of FIGS. 3A-3C, the user moves his finger downward along the unrenderable portion 24 at the bottom of the display (in the opposite direction of arrow 34). For the side launch of FIGS. 4A-4C, the user moves his finger outward along the unrenderable portion 24 (in the opposite direction of arrow 32). As a result, the processor 12 causes the virtual keyboard 30 to begin to move downward or sideways and off the renderable portion 22 of the display until the virtual keyboard is no longer being rendered to the user.

Figure 5:
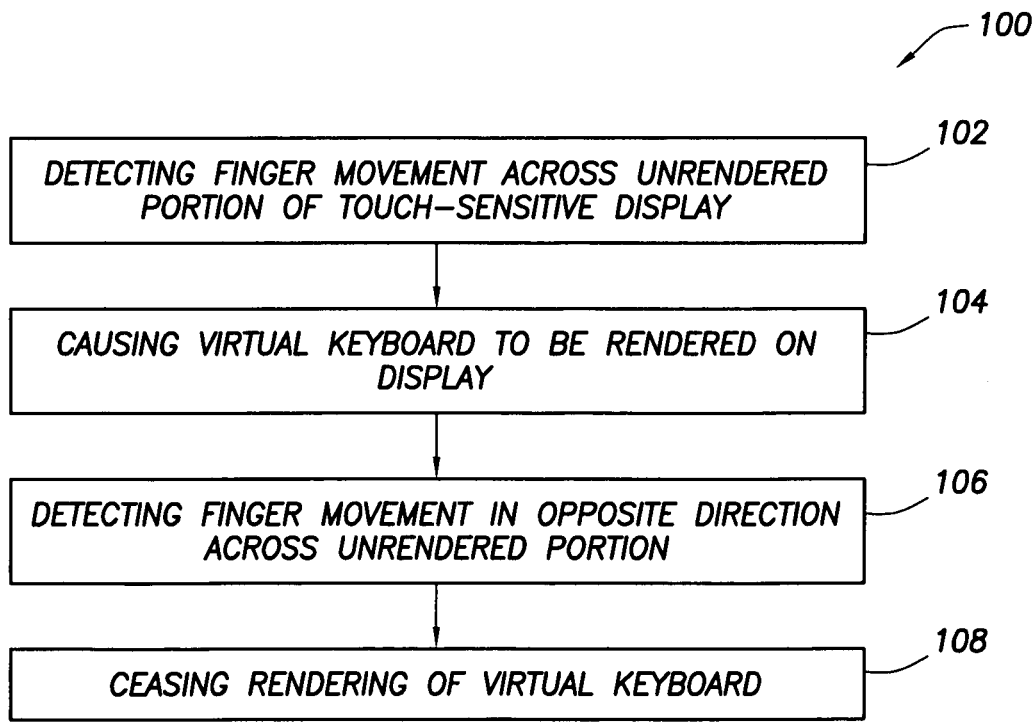
FIG. 5 shows a method in accordance with various embodiments.

FIG. 5 illustrates a computer-implemented method 100 in accordance with various embodiments of the invention. Some or all of the actions of the method 100 of FIG. 5 preferably are performed by processor 12 executing software 16. At 102, the method comprises detecting finger movement across the unrendered portion 24 of the touch-sensitive display 20. As a result, at 104 the method comprises causing the virtual keyboard 30 to be rendered on the display 20. As explained above, rendering the virtual keyboard preferably comprises animating the virtual keyboard to enter the display from one edge of the display to be fully shown on the display.

If the user desires to have the virtual keyboard removed from the display, the method 100 comprises detecting a person's finger moving across the unrendered portion preferably in the opposite direction from the direction associated with launching the keyboard in the first place. As a result, the method comprises ceasing rendering of the virtual keyboard 30, preferably by animating the keyboard off the display.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
   detecting, by a touch-sensitive display, user touch across and over an unrendered portion of the touch-sensitive display; and
   as a result of detecting the user touch, a processor causing data to be rendered as a virtual input device image on a display,
   wherein the unrendered portion of the touch-sensitive display is underneath a bezel separate from the touch-sensitive display, the touch-sensitive display detecting the user touch across and over the unrendered portion through the bezel.

2. The method of claim 1 wherein causing the virtual input device image to be rendered comprises the processor animating the virtual input device image to enter the display from one edge of the display to be fully shown on the display.

3. The method of claim 1 wherein the processor causing data to be rendered as a virtual input device image on a display comprises the processor causing data to be rendered as a virtual keyboard image on a display.

4. The method of claim 1 further comprising the processor causing the virtual input device image to cease being rendered on the display as a result of detecting the user touch across the unrendered portion.

5. The method of claim 4 wherein causing the virtual input device image to cease being rendered comprises the processor animating the virtual input device image to exit the display.

6. The method of claim 4 wherein the processor causing the virtual input device image to cease being rendered on the display is as a result of detecting the user touch across the unrendered portion of the display in an opposite direction from a direction associated with causing the virtual input device image to be rendered on the display.

7. The method of claim 1 wherein detecting the user touch across an unrendered portion of a touch-sensitive display comprises the processor detecting the user touch across a bezel of a touch-sensitive display.

8. The method of claim 1, wherein the touch-sensitive display comprises a touch-sensitive panel that is configured to detect touch, the touch-sensitive panel comprising a renderable portion and the unrendered portion.

9. The method of claim 1, wherein the unrendered portion of the touch-sensitive display is apart from a bezel surrounding the touch-sensitive display.

10. The method of claim 1, wherein the unrendered portion of the touch-sensitive display is integral with a renderable portion of the touch-sensitive display.

11. A system, comprising:
    logic;
    a bezel; and
    a touch-sensitive display separate from the bezel and coupled to said logic, said display having an unrenderable outer portion, the unrenderable outer portion underneath the bezel;
    wherein the logic, in response to the touch-sensitive display detecting user touch across and over the unrenderable outer portion through the bezel, causes a virtual input device image to be rendered on the display.

12. The system of claim 11 wherein the virtual input device image comprises a virtual keyboard image.

13. The system of claim 11 wherein the logic causes the virtual input device image to be rendered on the display by animating movement of the virtual input device image from the unrenderable outer portion through a renderable portion of the display.

14. The system of claim 11 wherein the logic detects the user touch across the unrenderable outer portion and, in response, causes the virtual input device image to be removed from the display.

15. The system of claim 14 wherein the logic causes the virtual input device image to be removed by animating the virtual keyboard image to move off the display.

16. A non-transitory computer-readable storage medium containing software that, when executed by a processor, causes the processor to:
    responsive to a touch-sensitive display detecting user touch across an unrendered portion of the touch-sensitive display,
    cause a virtual keyboard image to be rendered on the display,
    wherein the unrendered portion of the touch-sensitive display is underneath a bezel separate from the touch-sensitive display, the touch-sensitive display detecting the user touch across and over the unrendered portion through the bezel.

17. The non-transitory computer-readable storage medium of claim 16 wherein the software further causes the processor to remove the virtual keyboard image from the display upon detecting the user touch across the unrendered portion in a direction opposite that of which resulted in the virtual keyboard image to be rendered on the display.

18. The non-transitory computer-readable storage medium of claim 16 wherein the software causes the processor to causes the virtual keyboard image to be rendered by animating its motion across at least a portion of the display.

* * * * *